United States Patent
Tippy et al.

(10) Patent No.: US 7,347,177 B2
(45) Date of Patent: Mar. 25, 2008

(54) FUEL PUMP CONTROL

(75) Inventors: David J. Tippy, Ann Arbor, MI (US); Mike Harrigan, Sr., Ann Arbor, MI (US); Mike William Soltis, Livonia, MI (US); Rene A. Najor, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 70 days.

(21) Appl. No.: 11/404,647

(22) Filed: Apr. 14, 2006

(65) Prior Publication Data

US 2007/0240684 A1    Oct. 18, 2007

(51) Int. Cl.
*F02B 17/00* (2006.01)
*B60K 28/12* (2006.01)

(52) U.S. Cl. .................... 123/198 DB; 180/284
(58) Field of Classification Search ............... None
See application file for complete search history.

(56) References Cited

U.S. PATENT DOCUMENTS

| | | | |
|---|---|---|---|
| 3,550,717 A * | 12/1970 | Franklin, Jr. ........... | 180/284 |
| 5,033,428 A * | 7/1991 | Sasaki .................. | 123/198 D |
| 5,291,578 A * | 3/1994 | Kalami ................. | 388/831 |
| 5,313,923 A | 5/1994 | Takeuchi et al. | |
| 5,441,026 A * | 8/1995 | Akimoto ............... | 123/198 D |
| 5,555,872 A | 9/1996 | Takeuchi et al. | |
| 5,651,347 A | 7/1997 | Oi et al. | |
| 5,752,490 A * | 5/1998 | Rodgers et al. ......... | 123/497 |
| 6,024,072 A | 2/2000 | Hamada | |
| 6,092,500 A * | 7/2000 | Frank et al. ........... | 123/198 D |
| 6,223,714 B1 * | 5/2001 | Anderson et al. ....... | 123/198 D |
| 6,354,261 B1 * | 3/2002 | Lassiter ................ | 123/198 D |
| 6,367,455 B2 | 4/2002 | Hirata et al. | |
| 6,640,174 B2 * | 10/2003 | Schondorf et al. ....... | 701/45 |
| 7,055,640 B2 * | 6/2006 | Cook ................... | 180/284 |
| 7,086,493 B2 * | 8/2006 | Knight ................. | 180/274 |
| 2005/0051376 A1 * | 3/2005 | Cook ................... | 180/284 |
| 2005/0236213 A1 * | 10/2005 | Hosoya ................. | 180/284 |

* cited by examiner

*Primary Examiner*—Thomas Moulis
(74) *Attorney, Agent, or Firm*—David B. Kelley; MacMillan, Sobanski & Todd, LLC.

(57) ABSTRACT

An apparatus in a mechanical returnless fuel system is provided that includes a fuel pump motor for providing fuel to a powertrain system. A powertrain control module provides an activation signal for activating the fuel pump motor. A restraint control system includes a restraint control module for providing a disabling signal for disabling the fuel pump motor in response to a vehicle impact. An electronic relay switch is adapted for coupling to the fuel pump motor to selectably energize the fuel pump motor according to a conductive state and a non-conductive state of the electronic relay switch. A relay controller packaged with the electronic relay switch is responsive to the activation signal and the disabling signal for selecting the conductive state according to the activation signal when the disabling signal is not present and selecting the nonconductive state when the disabling signal is present.

27 Claims, 3 Drawing Sheets

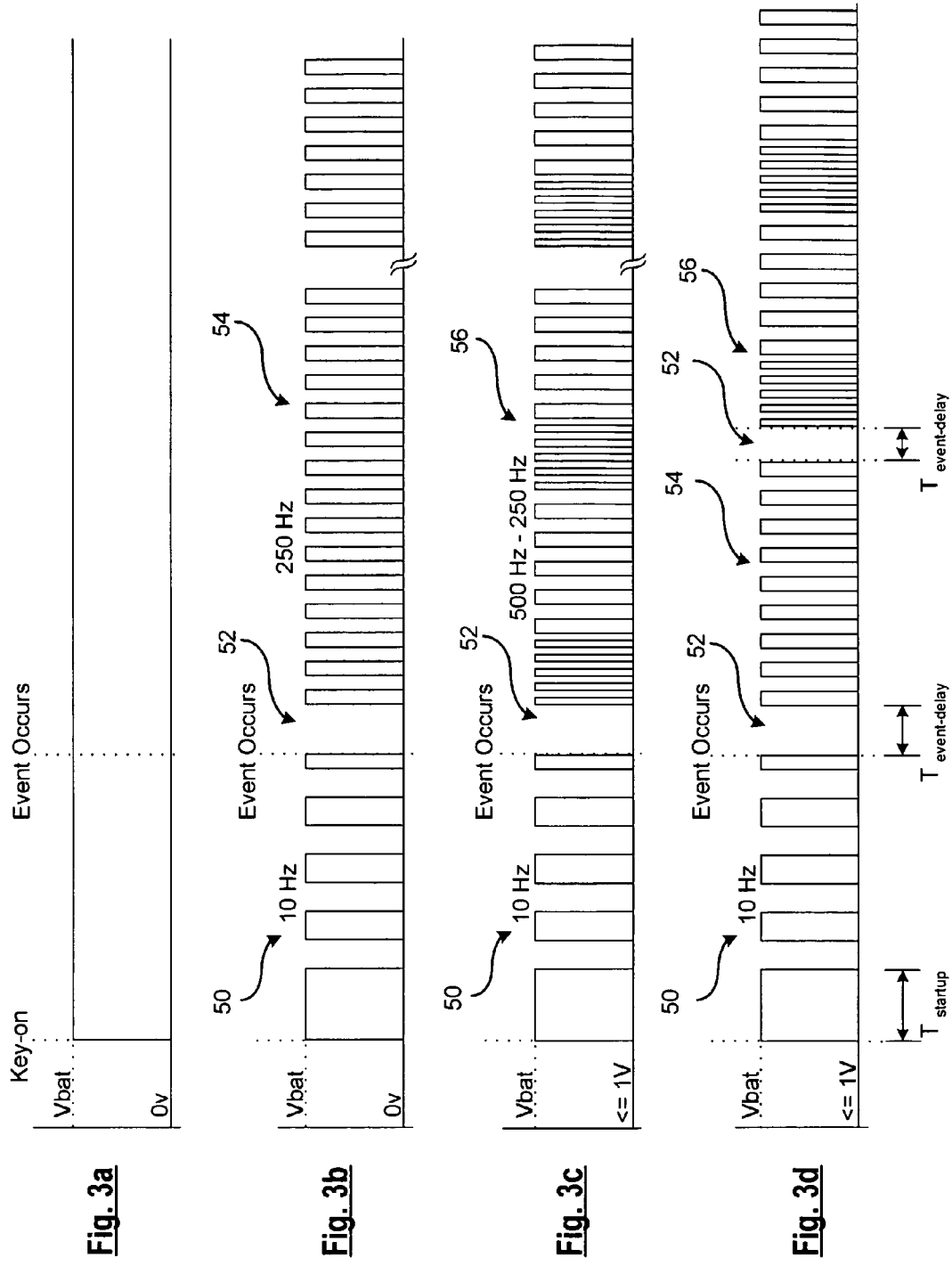

| RCM Input | PCM Input | Smart Relay Output |
|---|---|---|
| Enable | Enable (low voltage) | Close Contacts (Enable Fuel Pump) |
| Disable | Enable (low voltage) | Open Contacts (Disable Fuel Pump) |
| Enable | Disable (high voltage) | Open Contacts (Disable Fuel Pump) |
| Failure Modes | | |
| Faulted | Enable (low voltage) | Close Contacts (Enable Fuel Pump) |
| Enable | Open circuit or short to battery fault | Open Contacts (Disable Fuel Pump) |
| Enable | Short to ground fault | Close Contacts (Enable Fuel Pump) |
| Disable | Any fault | Open Contacts (Disable Fuel Pump) |

Fig. 4

FUEL PUMP CONTROL

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A SEQUENCE LISTING, A TABLE, OR A COMPUTER PROGRAM LISTING COMPACT DISC APPENDIX

Not Applicable

BACKGROUND OF THE INVENTION

1. Field of the Invention

This invention relates in general to a fuel delivery system, and more in particular, to fuel pump control in a mechanical returnless fuel system.

2. Description of the Related Art

Inertia switches are commonly used in vehicles to disable the fuel pump in the event of a severe vehicle crash. The inertia switch is similar to a relay that the inertia switch includes a first contact for receiving power and a second contact for outputting power to the fuel pump motor. As opposed to an electric solenoid coil or some thermal expansion device required to break the power feed circuit, the inertia switch uses a mechanical element consisting of a steel ball in a funnel. The steel ball is held in place by a magnet disposed in the bottom of the funnel. When the vehicle is subjected to impacts or vehicle roll, the steel ball will break free from the magnet and roll up the funnel. At the top of the funnel is an arm switch mechanism. As the steel ball approaches the top of the funnel, the steel ball contacts the arm switch mechanism thereby opening the circuit and disconnecting power to the fuel pump. A disadvantage with the inertia switch is that proper calibration and packaging of the inertia switch is becoming increasingly difficult due to the characteristics of current vehicle structures.

The inertia switch is a stand-alone component that is separate from current production vehicle impact sensing systems which sense vehicle impacts and provide safety countermeasures such as airbag deployment and other safety measures. It would be advantageous to replace the inertia switch without the expense if applying an additional system. The replacement unit for the inertia switch must also be reliable in sensing and determining a vehicle impact and also be compatible with the current fuel delivery system such that it would not interfere with fuel delivery system in its normal operating state but only intervene in the event of a vehicle impact.

What would be advantageous is to have a system that may be utilized without changing the current architecture of the fuel delivery system but have benefits of use with the vehicle impact sensing, notification, and fuel control operations.

BRIEF SUMMARY OF THE INVENTION

The present invention has the advantage of eliminating an inertia switch of a vehicle by utilizing the vehicle's restraint control module to sense a vehicle impact and provide a means via an electronic fuel pump relay to disable the fuel pump. The received signal from the restraint control module is preferably a frequency modulated signal which assists in determining the validity of the received signal before deploying the fuel cut-off. The present invention includes the added benefit of allowing the powertrain control module to variably control the fuel pump in a mechanical returnless fuel system by using pulse width modulation via the electronic fuel pump relay.

In one aspect of the present invention, an apparatus in a mechanical returnless fuel system is provided that includes a fuel pump motor for providing fuel to a powertrain system. A powertrain control module provides an activation signal for activating the fuel pump motor. A restraint control system includes a restraint control module for providing a disabling signal for disabling the fuel pump motor in response to a vehicle impact. An electronic relay switch is adapted for coupling to the fuel pump motor to selectably energize the fuel pump motor according to a conductive state and a non-conductive state of the electronic relay switch. A relay controller packaged with the electronic relay switch is responsive to the activation signal from the powertrain control module and the disabling signal from the restraint control module for selecting the conductive state according to the activation signal when the disabling signal is not present and selecting the nonconductive state when the disabling signal is present.

Various objects and advantages of this invention will become apparent to those skilled in the art from the following detailed description of the preferred embodiment, when read in light of the accompanying drawings.

BRIEF DESCRIPTION OF THE DRAWINGS

FIG. 3a is a timing diagram of ignition battery voltage according to the present invention.

FIG. 3b is a timing diagram of deployment event notification according to the present invention.

FIG. 3c is a timing diagram of fuel cut-off event notification according to the present invention.

FIG. 3d is a timing diagram of combined deployment event notification and fuel cut-off event notification according to the present invention.

FIG. 4 is a logic table for the fuel pump control system according to the present invention.

DETAILED DESCRIPTION OF THE PREFERRED EMBODIMENT

Figure 1:
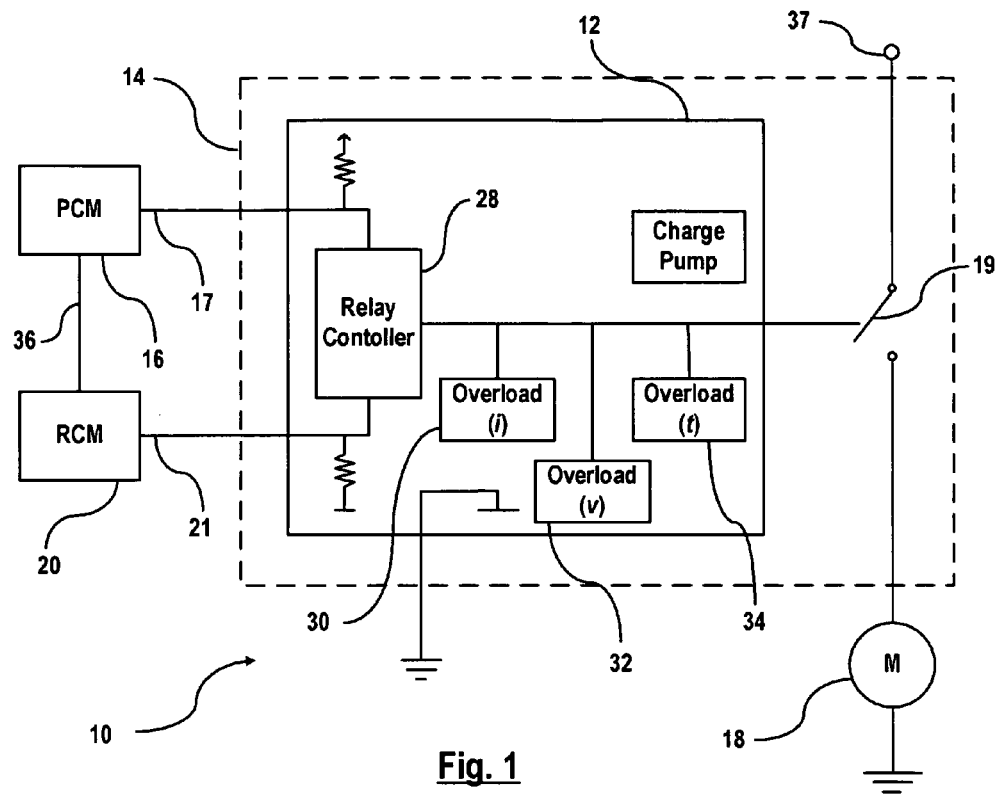
FIG. 1 is a schematic of a fuel pump control system according to the present invention.

Referring now to the drawings, there is illustrated in FIG. 1 a fuel pump control system, generally indicated at 10, according to the present invention. The fuel pump control system includes a smart fuel pump relay 12 (i.e., electronic fuel pump relay) that is packaged in a relay module 14 that may preferably provide the same vehicle connections as a conventional pump relay. The footprint of the smart fuel pump relay 12 is similar to existing relay packages which allows the smart fuel pump relay 12 to be plugged into existing junction boxes (not shown) and which makes it compatible with past and present powertrain and fuel system architectures. The smart fuel pump relay 12 is connected to a powertrain control module (PCM) 16 via a first communication line 17. The PCM 16 controls the operation of the powertrain system including a fuel pump motor 18 which will be discussed in detail later.

The smart fuel pump relay 12 is connected to a restraint control module (RCM) 20 via a second communication line 21. The RCM 20 is in communication with vehicle impact sensors (not shown) that sense vehicle impact-related parameters such as acceleration, door cavity pressure, and rollover angular rate. Based on the received vehicle impact-related parameters, the RCM 20 determines an occurrence of a vehicle impact and provides control signals to various deployable restraint devices such as harness restraint tensioners, deployable air bags, and window curtains. The RCM 20 also communicates an event notification signal (ENS) to the smart fuel pump relay 12 in the event of a vehicle impact to disable the fuel pump motor 18 which results in fuel being cut-off from to the fuel delivery system.

The smart fuel pump relay 12 includes a relay controller 28 such as a microprocessor or a logic driver circuit. An electronic relay switch 19 is coupled in series between a power source 37, such as the ignition supply line, and the fuel pump motor 18. The electronic relay switch 19 is operable for connecting power to and disconnecting power from the fuel pump motor 18 based on an output command received from the relay controller 28. The electronic relay switch 19 is in a conductive state when the contacts are closed and in non-conductive state when the contacts are open. Preferably, the relay controller 28 is a solid state device and the electronic relay switch 19 includes mechanical contacts. Mechanical contacts provide longevity of the contacts for the electronic relay switch 19. Alternatively, the entire smart fuel pump relay 28 includes the electronic relay switch 19 may be a solid state device.

The smart fuel pump relay 12 further includes an over-current sensor 30, an over-voltage sensor 32, and an over-temperature sensor 34. The over-current sensor 30, the over-voltage sensor 32, and the over-temperature sensor 34 monitor the current, voltage, and temperature, respectively, of the solid state device itself.

The PCM 16 monitors and controls the operation of the powertrain system including the fuel pump motor 18. The PCM 16 provides control signals to the smart fuel pump relay 12 for controlling operation of the fuel pump motor 18 via the electronic relay switch 19. In addition to activating the fuel pump motor simultaneously with starting of the engine, an activation signal from the PCM 16 may be used to control the speed of the fuel pump motor 18. The PCM 16 input behavior is based on an open-drain type of interface in the PCM and a weak bias to high voltage on the PCM input of the smart fuel pump relay 12.

Controlling the operation of the fuel pump motor 18 via the smart fuel pump relay 12 is advantageous in mechanical returnless fuel systems (MRFS). Typically in a MRFS (not shown) a fuel pump motor is energized by the maximum vehicle battery voltage for operating the fuel pump motor at a single speed in contrast to an electronic returnless fuel system (ERFS) which typically utilizes a computer or standalone module to electrically control the duty cycle of the fuel pump motor to provide the precise amount of fuel as demanded. An advantage of the MRFS is that the MFRS is less costly than the EFRS. A disadvantage of the MRFS is that the fuel pump constantly operates at 100% high speed which produces high current draw, reduces fuel efficiency, and generates heat build up in the fuel causing fuel vapor emissions.

Utilizing the smart fuel pump relay 12 in a MRFS allows the fuel pump motor 18 to be duty cycled without adding an additional controlling module since the smart fuel pump relay 12 is interchangeable with existing fuel pump relay packages with a respective junction box. The PCM 16 provides input commands (i.e., the activation signal) to the relay controller 28 for duty cycling the opening and closing the contacts of the electronic relay switch 19 at timed intervals. This allows the fuel pump motor 18 to be controlled utilizing pulse width modulation (PWM). Preferably, the activation signal from the PCM 16 includes a pulsed signal indicative of a respective duty cycle. The relay controller 28 receives the activation signal and translates the activation signal into a translated duty cycle for controlling the fuel pump motor (e.g., activation signal transmitted at 40% duty cycle and the relay controller translates the duty cycle to 80% for controlling the fuel pump motor at 80% duty cycle). Alternatively, the relay controller 28 may implement a duty cycle for the fuel pump motor 18 equal to the duty cycle of the activation signal provided by the PCM 16. As another alternative, the PCM 16 may provide an alternatively encoded activation signal to the relay controller 28 that is translated to a respective duty cycle for pulse width modulating the fuel pump motor 18 at a respective duty cycle. Two or more operating speeds of the fuel pump using pulse width modulation may be activated by PCM 16.

The PCM 16 and the smart fuel pump relay 12 also allow for PWM under tunable conditions. For example, the tunable conditions may be based on (1) engine operation-based set points for switching between different operating speeds; (2) low power duty cycle; (3) combination of (1) and (2) above for maximum fuel economy; (4) time constants for speed of switching between operating modes; and (5) designed in hysteresis about the switching set points.

As discussed earlier, the RCM 20 is utilized in cooperation with a smart fuel pump relay 12 under emergency vehicle impact conditions to disable the fuel pump motor 18, but does not interfere with the operation of the fuel delivery operations during non-impact operating conditions. The RCM 20 is hardwired via the second hardwired communication line 21 to the smart fuel pump relay 12 and provides vehicle status information directly to the smart fuel pump relay 12 in the form of the ENS. When the power is provided to the vehicle after ignition key-on, the ENS is constantly transmitted to the logic control circuit 28 of the smart fuel pump relay 12 throughout the key-on duration. The data within the ENS contains vehicle impact status information as to whether there is a vehicle impact or whether there is no vehicle impact.

The smart fuel pump relay 12 receives and interprets the ENS communicated from the RCM 20. The electronic relay switch 19 enters the non-conductive state when the relay controller 28 determines that the ENS contains a fuel cut-off request (i.e., disabling signal) made by the RCM 20. In the absence of the ENS containing a fuel cut-off request, the ENS contains no-event status data which maintains the electronic relay switch 19 in the conductive state and the fuel pump motor enabled at all times.

The PCM 16 also receives vehicle impact status information from the RCM 20. Preferably, the communication is sent from the RCM 20 to the PCM 16 by a dedicated third communication line 36. The impact status information provides status information to the PCM 16 concerning the occurrence of a vehicle impact and the request for fuel cut-off. Alternatively, the impact status information may be sent via a shared bus line or wireless communication. In the event that a vehicle impact occurs but communication from the RCM 20 to the smart fuel pump relay 20 is not received (e.g., severed communication line), the PCM 16 may communicate a fuel cut-off request signal (i.e., disabling signal)

directly to the smart fuel pump relay 12 as a back-up communication signal. The fuel cut-off request signal from the PCM 16 to the smart fuel pump relay 12 is in response to both RCM 20 directly informing the PCM 16 of the vehicle impact and the PCM 16 monitoring an ongoing powertrain operation. That is, if the PCM 16 receives information that a vehicle impact has occurred from the RCM 20 and the powertrain continues to operate thereafter (e.g., operational for a predetermined period of time), the PCM 16 may conclude that the communication from the RCM 20 to the smart fuel pump relay 12 is not being received, and the PCM 16 will directly signal the smart fuel pump relay 12 to disable the fuel pump motor 18. After a vehicle impact has occurred and fuel pump motor 18 is disabled, the PCM 16 may re-enable power to the fuel pump motor 18 after a defined key-off key-on sequence or enablement event.

Figure 2:
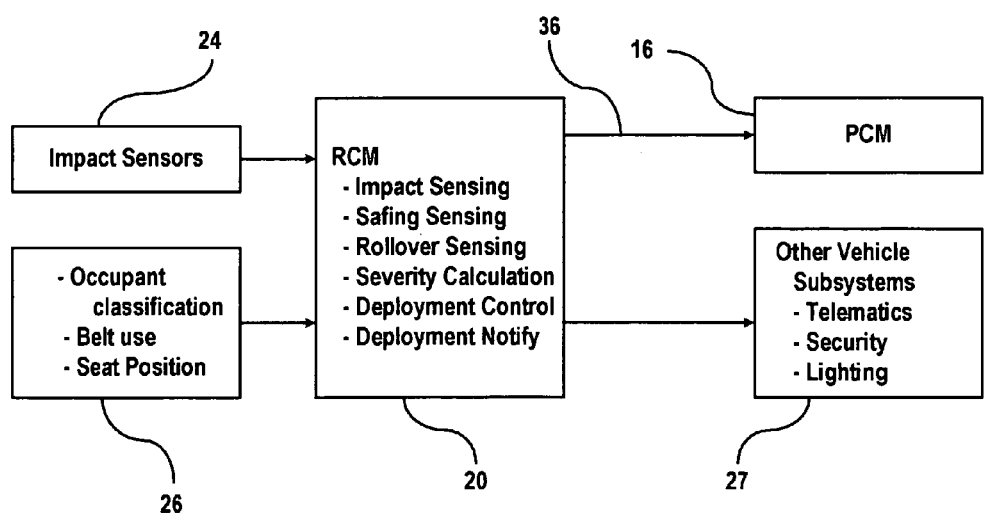
FIG. 2 is a block diagram restraint control notification system according to the present invention.

FIG. 2 illustrates a block diagram of the RCM's system architecture shown generally at 22. The RCM system architecture 22 includes a plurality of impact sensors 24 that are disposed at various locations of the vehicle. The RCM system architecture 22 further includes a least one monitoring device 26 which provides occupant monitoring (e.g., occupant classification), safety restraint monitoring for determining whether a safety restraint is enabled or disabled (e.g., seat belts), and seat position monitoring for providing information regarding position of the vehicle occupant within a vehicle seat.

The plurality of impact sensors 24 and the at least one monitoring device 26 are connected to the RCM 20. In response to input data received from the plurality of impact sensors 24 and the at least one monitoring device 26, the RCM 20 provides sensing operations such as impact sensing, safing sensing, and rollover sensing. The RCM 20 further determines severity calculations, safety restraint deployment control, and safety restraint deployment notification. Impact event notifications as determined by the RCM 20 may be communicated to the powertrain system, namely the PCM 16, to inform the PCM 16 of the fuel cut-off request or to other various subsystems 27 for either notification of the impact event or to take corrective actions with respect to the impact event. Other various subsystems 27 may telematics, security, and lighting systems.

The ENS transmitted from the RCM 20 to the smart fuel pump relay 12 preferably comprises a frequency modulated signal. The frequency modulated signal allows the smart fuel pump relay 12 receiving the ENS to distinguish between a disabling signal and potential noise on the ENS line which could otherwise be incorrectly interpreted as a request for fuel cut-off.

Referring to FIG. 3*a-d*, there is shown signal characteristics of the ENS. An ENS is provided on a single communication line having 3 logic states that are output to each of the various control devices. The three logic states include a normal state event, an airbag deployment state event, and a fuel cutoff state event. Each devices will receive all of the communicated logic state signals on the ENS, however, the various control devices will react only to a designated logic state with for which it is programmed to react to. Alternatively, two or more communication lines may be used to provide only the designated logic state signal to its intended designated control device.

FIG. 3*a* illustrates the battery voltage of the vehicle after the ignition is switched to a key-on position for providing power to the vehicle including the powertrain system.

FIG. 3*b* illustrates an ENS transmitted from the RCM (shown in FIG. 1) containing status data identifying an occurrence of a deployment event. A deployment event is defined as a time frame when a vehicle impact has occurred and decisions are made as to a severity of the vehicle impact and requests for safety countermeasures are communicated to the subsystems as a result of the vehicle impact. Such countermeasures may include airbag deployment, call to emergency services, and other emergency options.

Upon a key-on operation and prior to a vehicle impact occurring, a no-event notification transmitted on the ENS line 50 is representative of a normal operating state where there is no occurrence of a vehicle impact and the vehicle is operating in its normal operating mode. The no-event notification 50 is represented by a fixed frequency signal at 10 Hz signal. The no-event notification is continuously transmitted by the RCM to the smart fuel pump relay during the key-on ignition state until the ignition is turned off or until a vehicle impact is sensed and notification from the RCM to the smart fuel pump relay is required.

When a vehicle impact is detected, a time event-delay 52 is transmitted on the ENS line. The time event-delay 52 is a time delay where the modulating frequency of the ENS is zero for a predetermined period of time (e.g., 4 ms to 10 ms). After the predetermined period of time has elapsed, a deployment event notification 54 is transmitted on the ENS line. The deployment event notification 54 is a fixed frequency signal at 250 Hz. The deployment event notification 54 begins on the rising edge of the 250 Hz cycle and is continuously transmitted at 250 Hz until the ENS transmission is complete or until a next notification event requires transmission such as a request to disable the fuel pump motor.

FIG. 3*c* illustrates a fuel cut-off event notification, shown generally at 56 on the ENS line. In the event the RCM (shown in FIG. 1) has received input data that a vehicle impact has occurred and the RCM determines that fuel cut-off is required, the RCM interrupts the transmission of the no-event notification 50 and transmits the time delay-event 52 on the ENS line. After expiration of the time event-delay 52, a fuel cut-off event notification 56 (i.e., disabling signal) is transmitted on the ENS line. The fuel cut-off event notification 56 is frequency modulated for 5 cycles at 500 Hz followed by 5 cycles at 250 Hz. This frequency modulation of 5 cycles at 500 Hz and 5 cycles at 250 Hz is continuously repeated for the duration of the transmission of the ENS or until a next event notification requires transmission on the ENS line. The initiation of the fuel cut-off event notification 56 begins on a rising edge of the first of the 5 cycles of the 500 Hz. In addition, there is no time delay-event between the alternating frequencies (i.e., from 500 Hz to 250 Hz, and from 250 Hz to 500 Hz) within the fuel cut-off event notification 56. Since the fuel cut-off event notification is typically a more severe impact event than the deployment event notification, it is desirable to have the fuel cut-off event notification clearly distinguishable from the deployment event notification. Added electrical noise coupled on to the ENS may cause respective control listening devices (i.e., controllers) to incorrectly identify a respective signal if the two signals were transmitted at different fixed frequencies and were only distinguishable by a small difference between the fixed frequencies. Alternating the frequencies in the fuel cut-off event notification provides added robustness for distinguishing the fuel cut-off event notification from the deployment event notification and lessens the chances of an inadvertent fuel cut-off.

It should be noted that the relay controller of the smart fuel pump relay is tunable so that only a partial handshake of the ENS may be required to disable the fuel pump motor. For example, the relay controller may require that it see a minimum number of cycles (i.e., number of cycles less than the 5 cycles at each respective frequency) for determining that request is made to disable the fuel pump motor. The occurrence of less than the transmitted number of cycles received by the relay controller may be the result of noise on the ENS; however, selecting a minimum number of cycles for determining the validity of the fuel cut-off request may still provide a reliable disabling signal for determining that a vehicle impact has occurred.

FIG. 3d illustrates the fuel cut-off event notification 56 occurring after the deployment event notification 54 has commenced on the ENS line. In the event the RCM (shown in FIG. 1) has determined that fuel cut-off is required during the transmission of the deployment event notification 54, the RCM interrupts the transmission of the deployment event notification 54 and transmits the time delay-event 52. After expiration of the time event-delay 52, a fuel cut-off event notification 56 (i.e., disabling signal) is transmitted. As stated earlier, transmission of the fuel cut-off event notification 56 shall begin on the rising edge of the first of the 5 cycles at 500 Hz followed by 5 cycles at 250 Hz. The fuel cut-off notification event 56 shall be continuously transmitted until the ENS transmission is complete or a next event notification requires transmission on the ENS line.

FIG. 4 is a table illustrating the commands as received by the RCM and the PCM and the resulting output of the smart fuel pump relay. As shown in the table, when a disabling signal is provided by the RCM which is indicative of a vehicle impact, the electronic relay is placed into the non-conductive state by the relay controller thereby opening the contacts of the electronic relay switch for disconnecting power to the fuel pump motor. The result is the cut-off of fuel to the fuel delivery system. Similarly, if a disabling signal is received from the PCM, then the electronic relay is placed into the non-conductive state by the relay controller and fuel pump operation is disabled.

Failure modes may also affect the decision making of the PCM. For example, if a low voltage is detected by the PCM, the contacts of the smart fuel pump relay remain closed and fuel pump operation remains enabled. If a short to ground fault occurs, then the contacts remain closed and fuel pump operation remains enabled. In contrast, an open circuit fault or a short to battery fault as detected by the PCM will disable the fuel pump operation. When a RCM fault occurs, fuel delivery remains enabled since it is undesirable to place the RCM in the critical path for basic vehicle operations. It should be noted the faults illustrated in the table are exemplary and resulting operation of the relay switch and fuel pump operation may be modified as desired.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. An apparatus in a mechanical returnless fuel system, said mechanical returnless fuel sytem including a fuel pump motor for providing fuel to a powertrain system, a powertrain control module for providing an activation signal for activating said fuel pump motor, and a restraint control system including a restraint control module for providing a disabling signal for disabling said fuel pump motor in response to a vehicle impact, said apparatus comprising:

an electronic relay switch packaged outside of a fuel tank and adapted for coupling to said fuel pump motor to selectably energize said fuel pump motor according to a conductive state and a non-conductive state of said electronic relay switch;

a relay controller packaged with said electronic relay switch responsive to said activation signal from said powertrain control module and said disabling signal from said restraint control module for selecting said conductive state according to said activation signal when said disabling signal is not present and selecting said nonconductive state when said disabling signal is present.

2. The fuel pump control system of claim 1 wherein said restraint control module provides an enabling signal and said powertrain control module provides said activation signal to said relay controller for selecting said conductive state.

3. The fuel pump control system of claim 1 wherein said restraint control module determines a fault in said restraint control system, and said conductive state is selected in response to said activation signal from said powertrain control module and said fault in said restraint control system being present.

4. The fuel pump control system of claim 1 wherein said powertrain control module determines a low voltage in said powertrain system and said restraint control module determines a fault present in said restraint control system, and said conductive state is selected in response to said low voltage in said powertrain control module and said fault in said restraint control system being present.

5. The fuel pump control system of claim 1 wherein said powertrain control module determines a short to ground fault in said powertrain system and said restraint control module determines a fault present in said restraint control system, and said conductive state is selected in response to said short to ground fault in said powertrain control module and said fault in said restraint control system being present.

6. The fuel pump control system of claim 1 wherein said powertrain control module determines an open circuit failure in said powertrain system, and said non-conductive state is selected in response to said open circuit fault signal from said powertrain control module being present.

7. The fuel pump control system of claim 1 wherein said powertrain control module determines a short to battery fault in said powertrain system, and said non-conductive state is selected in response to said short to battery fault from said powertrain control module being present.

8. The fuel pump control system of claim 1 wherein said restraint control module is in communication with said powertrain communication module, said restraint control module providing disabling signal to said powertrain control module, said powertrain control module determining a continuing operation of said fuel pump motor after receiving said disabling signal from said restraint control module, said powertrain control module providing said disabling signal to said relay controller for selecting said non-conductive state.

9. The fuel pump control system of claim 8 wherein said disabling signal is provided to said relay controller from said powertrain control module after said continuing operation of said fuel pump relay for a predetermined period of time.

10. The fuel pump control system of claim 1 wherein said disabling signal comprises a frequency modulated signal.

11. The fuel pump control system of claim 10 wherein said disabling signal includes a first predetermined number of pulses at a first frequency followed by a second predetermined number of pulses at a second frequency.

12. The fuel pump control system of claim 1 wherein said activation signal controls an operating speed of said fuel pump motor.

13. The fuel pump control system of claim 12 wherein said operating speed of said motor is controlled by pulse width modulation.

14. The fuel pump control system of claim 1 wherein said relay controller includes is a microprocessor for receiving input signals from the powertrain control module and the restraint control module.

15. The fuel pump control system of claim 1 wherein said relay controller includes is a logic driver circuit for receiving input signals from the powertrain control module and the restraint control module.

16. The fuel pump control system of claim 1 wherein said electronic relay switch includes mechanical contacts.

17. The fuel pump control system of claim 1 wherein said electronic relay switch includes a solid state device.

18. The fuel pump control system of claim 1 wherein said relay controller and said electronic relay switch are integrally packaged as a conventional pump relay adapted to be plugged into a vehicle junction relay box.

19. A method for controlling a fuel pump motor of in a mechanical returnless fuel system for providing power to a powertrain system that includes a powertrain control module for providing an activation signal for activating a fuel pump motor and a restraint control module for providing a disabling signal to an electronic fuel pump relay controller for disabling said fuel pump motor in response to a vehicle impact, said fuel pump relay packaged outside of a fuel tank including a relay controller that operatively controls a relay switch for energizing and de-energizing said fuel pump motor, said method comprising the steps of:

sensing a vehicle impact of said vehicle;

communicating said disabling signal from said restraint control module to said relay controller;

determining a validity of said disabling signal; and de-energizing said fuel pump motor via said relay switch in response to said disabling signal.

20. The method of claim 19 wherein further comprising the disabling signal is frequency modulated.

21. The method of claim 20 wherein said disabling signal is frequency modulated at a first predetermined number of pulses at a first frequency followed by a second predetermined number of pulses at a second frequency.

22. The method of claim 19 further comprising the step of:

said restraint control module providing said disabling signal to said powertrain control module;

determining a continued operation of said fuel pump motor; and providing said disabling signal from said powertrain control module to said relay controller in response to said continued operation of said fuel pump motor.

23. The method of claim 22 wherein said disabling signal is provided from said powertrain control module to said relay controller after said continued operation of said fuel pump for a predetermined period of time.

24. The method of claim 19 further comprising the step of controlling a speed of said fuel pump motor by said activation signal.

25. The method of claim 24 wherein said activation signal is pulse width modulated.

26. The method of claim 25 wherein said relay controller modifies said duty cycle of said pulse width modulated signal for controlling said speed of said fuel pump motor.

27. The method of claim 24 wherein said activation signal is duty cycled for operating said fuel pump motor in at least two operating speeds.

* * * * *